(12) United States Patent
Mower et al.

(10) Patent No.: US 6,975,683 B2
(45) Date of Patent: Dec. 13, 2005

(54) RADIO FREQUENCY BURST INTERFERENCE MITIGATION

(75) Inventors: Vaughn Lee Mower, Bountiful, UT (US); Merle LeRoy Keller, Jr., Salt Lake City, UT (US); Albert Earl Hansen, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 750 days.

(21) Appl. No.: 09/826,329

(22) Filed: Apr. 4, 2001

(65) Prior Publication Data

US 2002/0146077 A1 Oct. 10, 2002

(51) Int. Cl.[7] .............................................. H04L 27/00
(52) U.S. Cl. ...................... 375/259; 375/133; 375/141; 375/311; 375/345; 375/367
(58) Field of Search ............................... 375/259, 147, 375/150, 130, 219, 341, 141, 133, 345, 311, 375/367; 342/17, 150; 714/789; 370/326; 348/682; 455/1

(56) References Cited

U.S. PATENT DOCUMENTS

| 3,936,599 A | * | 2/1976 | Peil et al. ..................... 348/682 |
| 5,826,175 A | * | 10/1998 | Schmidt et al. ............... 455/77 |
| 6,233,712 B1 | * | 5/2001 | Rhee et al. .................. 714/789 |
| 2003/0099288 A1 | * | 5/2003 | Mower et al. ............... 375/229 |

* cited by examiner

Primary Examiner—Shuwang Liu
Assistant Examiner—Ted M. Wang
(74) Attorney, Agent, or Firm—Perman & Green, LLP

(57) ABSTRACT

Coherent phase-shift keying ("PSK") radio frequency ("RF") systems locate a differential decoder ("DE") close to the transmitter of a first transceiver for transmitting a message to a second transceiver that includes a receiver having has a differential decoder ("DDE") close to the receiver to aid in the rapid recovery of remnant data of a message hit by a jamming ("J") pulse received at the receiver of the second transceiver.

12 Claims, 4 Drawing Sheets

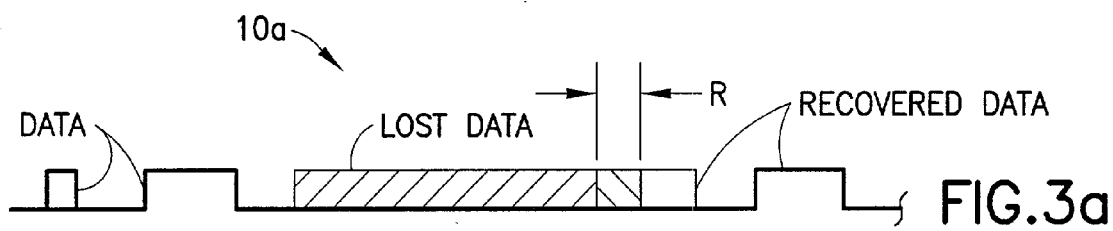
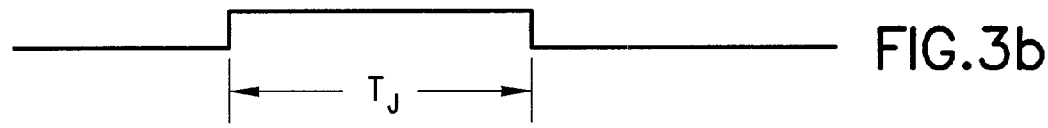
FIG.3a
FIG.3b
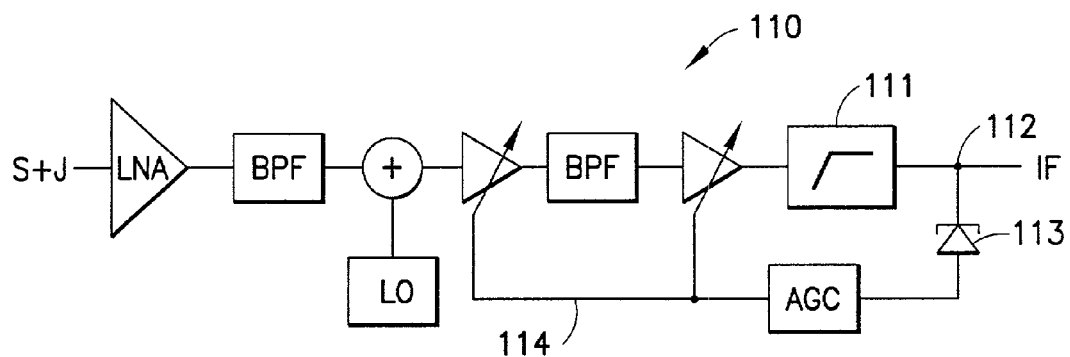
FIG.4
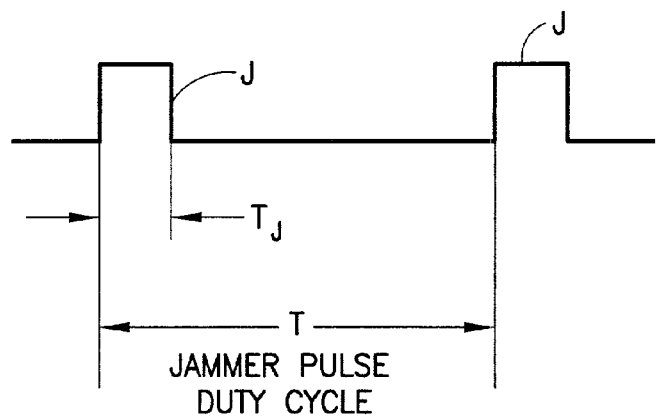
FIG.5

RADIO FREQUENCY BURST INTERFERENCE MITIGATION

BACKGROUND

This disclosure is directed to new and improved methods and systems that mitigate the effect of large amplitude, long width jamming ("J") pulses on data transmitted between coherent data communication system transceivers.

Coherent systems refer to radio transmission systems that employ binary phase-shifted keyed ("PSK") binary data modulation systems, coherent quadrature PSK ("QPSK") systems and two-channel PSK systems, for example. The J pulse mitigation methods and systems herein pertain to environments wherein the power level of a J pulse burst interference signal is, for example, a hundred times the power level of data signals transmitted between a calling coherent system transceiver and a called coherent system transceiver.

Coherent radio communication methods and systems, including the specifically identified types, employ a plurality of well-known digital signal processing elements arranged in known sequences. See, FIG. 1.

The prior art coherent radio communication system of FIG. 1 includes transceivers 1 and 2 that transmit a message between them using the transmitter half Tx1 of transceiver 1 and the receiver half Rx2 of transceiver 2.

The message processing elements of the transmitter half Tx1 include:

(1) Multiplexer ("MUX") Tx1a for forwarding a digital data message comprising binary bits to a calling party over one of several radio channels managed by MUX Tx1a to a called party accessible over an addressed channel among multiple channels managed by de-multiplexer Rx2h of receiver Rx2;

(2) data encrypter ("ENCRYPT") Tx1b for encrypting the message to allow only authorized receivers access to the message;

(3) differential PSK data encoder ("DE") Tx1c for encoding the encrypted message received from the encrypter into a digital form suited for transmission over a radio transmission channel between transceivers 1 and 2 created by one transceiver calling or addressing the other;

(4) forward error correction ("FEC") encoder Tx1d, for example, a Reed-Solomon ("RS") encoder for dividing the digital data message stream into blocks that are then encoded by adding parity bits that relate only to the information in the blocks;

(5) interleaver ("I") Tx1e follows the Reed-Solomon FEC encoder for interleaving data into the RS blocks to provide extra protection against data loss in the transmission channel. The interleaving consists of writing data into RS blocks within FEC memory in sequence but reading the data out in a different sequence such that bytes following each other in the transmitted data sequence are not from the same Reed-Solomon block of data;

(6) direct sequence spread spectrum modulator ("SSM") Tx1f for spreading the message into multiple parts by a pseudorandom number ("PRN" or "PN") generator wherein each part is uniquely identified by a PN code number;

(7) radio frequency transmitter Tx1g for transmitting the encrypted, differentially encoded, FEC encoded, interleaved and spread spectrum modulated message to receiver Rx2b of transceiver 2;

(8) antenna T1h for broadcasting the message at a frequency detectable by antenna Rx2a of transceiver 2 and recoverable by transceiver 2 wherein, the two antenna Tx1h and Rx2a define a transmission or communication channel between transceivers 1 and 2.

The receiver half Rx2 of transceiver 2 employs the same number of message processing elements as employed by the transmitter half Tx1 of transceiver 1 including:

(9) antenna Rx2a for detecting and forwarding a message to receiver Rx2b of transceiver 2;

(10) radio frequency receiver Rx2b for synchronizing to the incoming message and demodulating the message for mapping received message data symbols to receive message bit pairs to which downstream elements synchronize;

(11) direct sequence spread spectrum demodulator ("DSSSDM") Rx2c for reassembling spread parts of the transmitted message according to the PN numbers assigned to receiver Rx2;

(12) de-interleaver ("DI") Rx2d for separating the interleaved data bits from the RS encoded bits to aid the downstream FEC decoder with the recover of data lost during the transmission of the message;

(13) FEC decoder Rx2e for recovering the FEC encoded data from the RS blocks for recovering data lost during the passage of the message over the transmission channel;

(14) differential decoder Rx2f for recovering the message digital data bit pairs in an encrypted form;

(15) de-encrypter Rx2g for restoring the encrypted message to digital bit pairs comprising the message transmitted to transceiver 2 to an understandable form; and

(16) de-multiplexer Rx2h for routing the received message to a selected radio channel addressed by transmitter Tx1.

Transceivers 1 and 2 of FIG. 1 protect data from random, inadvertent interference signals found in commercial environments and from hostile J pulses of short duration. However, prior art transceivers of FIG. 1 are not equipped to protect transmitted messages from J pulses having high power levels and long pulse widths compared to the very low power level, short duration radio signals transmitted between the two prior art transceivers of FIG. 1.

SUMMARY

A coherent radio frequency digital data communication system is disclosed. The system is designed for mitigating the loss of digital data among segments of a transmitted message following the trailing edge of a jamming ("J") pulse that strikes a transmitted message, The system includes a transmitter Tx3 having multiple elements arranged in combination with one another.

Specifically, the system includes a transmitter Tx3 having multiple digital data processing elements including a forward error correcting ("FEC") encoder, an interleaver ("I") and a differential encoder ("DE"). The foregoing elements prepare a message for transmission to receiver Rx4 to which the message is addressed for processing by complementary elements at receiver Rx4.

The system also includes a receiver Rx4 having multiple, digital data processing elements that are complements to those of the transmitter Tx3. The receiver Rx4 elements include a differential data decoder ("DDE"), a de-interleaver ("DI") and a FEC decoder for processing an incoming digital data message and remnant data segments of a message struck by a J pulse during transmission from transmitter Tx3 to receiver Rx4.

Wherein, the DDE of receiver Rx4 synchronizes with both incoming data bit pairs and inverted data bit pairs among remnant data of a message struck by a J pulse during transmission thereby allowing the DDE, the DI and the FEC decoder to recover the message for a called party.

A coherent radio frequency digital data communication method is also disclosed. The method includes steps for mitigating the loss of digital data among segments of a transmitted message following the trailing edge of a jamming ("J") pulse that strikes a transmitted message.

The method employs a combination of steps at a transmitter and at a receiver.

At the transmitter, forward error correcting ("FEC"), interleaving ("I") and differential encoding ("DE") steps are performed on a message for preparing the message for processing by complementary elements at a receiver to which the message is addressed.

At the receiver, receiving an incoming message for correcting data errors therein, if any, by performing complementary steps to those performed on the message at the transmitter including differential data decoding ("DDE"), de-interleaving ("DI") and forward error correcting ("FEC") decoding the received message.

Also, receiving at the receiver Rx4 an incoming message for correcting data errors therein, if any, by performing complementary steps to those performed on the message at the transmitter including differential data decoding ("DDE"), de-interleaving ("DI") and forward error correcting ("FEC") decoding of the received message.

The method recovering incoming message data, including remnant message data of a message hit by a J pulse, simultaneously with demodulating the incoming message by receiver Rx4b for synchronizing the differential decoder ("DDE") with incoming data bit pairs or inverted bit pairs, within the incoming message and remnant data, thereby, preparing downstream processing elements for synchronizing with incoming message data for preventing loss of remnant data segments of the transmitted message.

DRAWINGS

The foregoing aspects and other features of the present invention are disclosed in the following description which should be read in conjunction with reference to the accompanying drawings, which are:

FIG. 1 is a schematic diagram of two prior art, two-way coherent radio communication systems identified as transceivers 1 and 2. Each transceiver includes the multiple digital signal processing elements of a transmitter half Tx1 of a first transceiver 1 and the multiple digital signal processing elements of a receiver half Rx2 of transceiver 2 that are complements of the elements of the transmitter half Rx1 of transceiver 1. The dashed horizontal line between transceivers 1 and 2 is intended to alert the reader that the receiver half of transceiver 1 and the transmitter half of transceiver 2 need not be shown as needlessly repetitive.

FIG. 2 is a block diagram of jamming pulse resistant methods and systems employing a new and improved arrangement of prior art digital data processing elements within the transmitter half Tx3 of transceiver 3 and employing corresponding, complementary elements to those of transceiver 3 within receiver half Rx4 of transceiver 4. As with FIG. 1, the dashed horizontal line between transceivers 3 and 4 is intended to alert the reader that the receiver half of transmitter 3 and the transmitter half of transceiver 4 need not be shown as needlessly repetitive.

FIG. 3(a) is a schematic representing a coherent digital data stream comprising a message within a communication channel between transceivers 3 and 4 of FIG. 2. A jamming pulse is depicted as having struck the message within the segment identified by the right-to-left cross-hatching. The much smaller segment of the message identified by the left to right cross-hatching is a recovery period allotted to transceiver 4 for re-synchronizing with the incoming coherent data and for processing the message for delivery to the called party.

FIG. 3(b) is a schematic of a square wave J pulse of a length $T_J$ that is aligned with the left-to-right cross hatched area within FIG. 3(a) to further identify the segment of the transmitted message that is struck by the J pulse and the remnant data that follows the trailing edge of the J pulse.

FIG. 4 is a schematic circuit of a portion of the demodulator employed by transmitter Rx4 that includes a phased lock loop ("PLL") for synchronization with incoming data signals and an automatic gain control ("AGC") circuit for recovering the remnants of an incoming message impacted by a J pulse. The AGC loop includes a burst clamp to prevent a J pulse from damaging a half-wave rectifying, detector diode within the AGC feedback loop and to avoid perpetuating the duration of the J pulse.

FIG. 5 is a drawing of a J pulse having a pulse width of $T_J$ and a duty cycle of $T_J/T$.

DESCRIPTION

Figure 1:
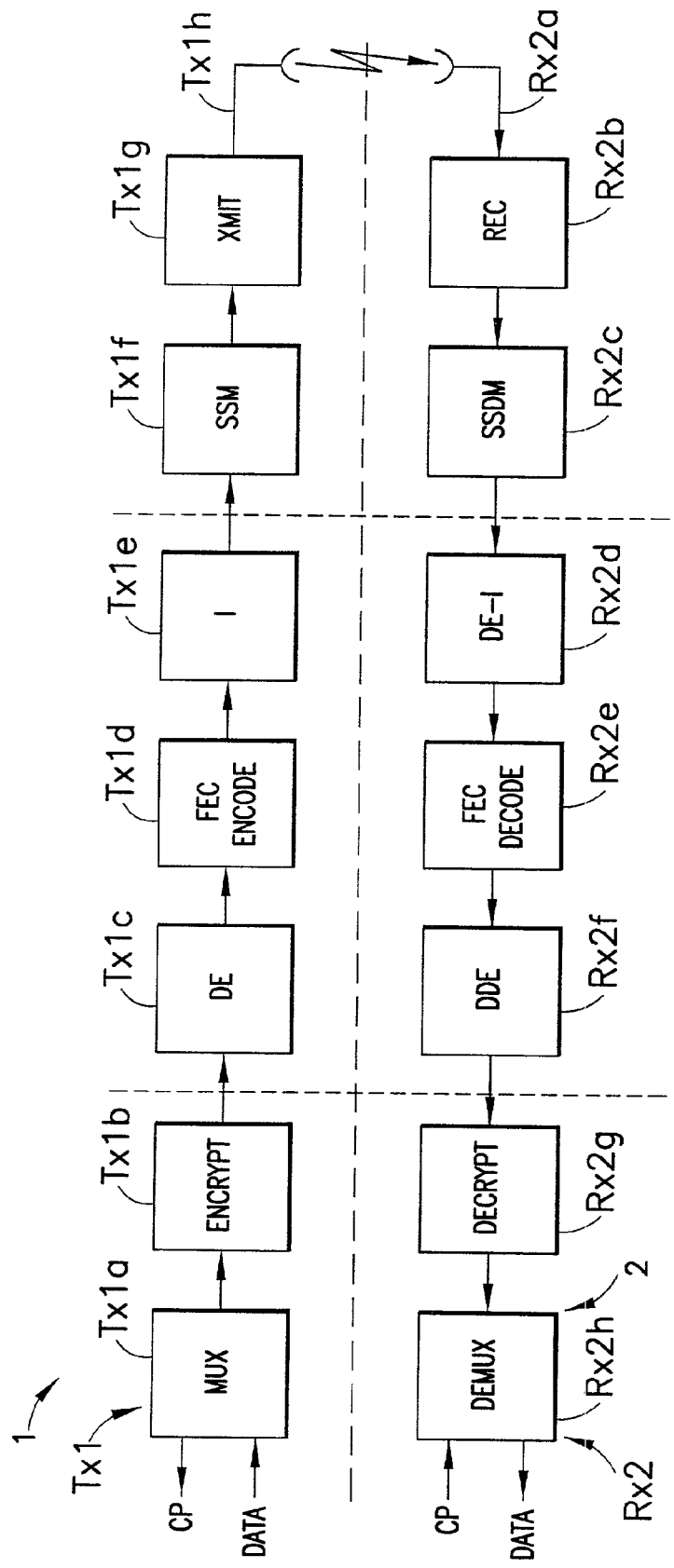
Figure 2:
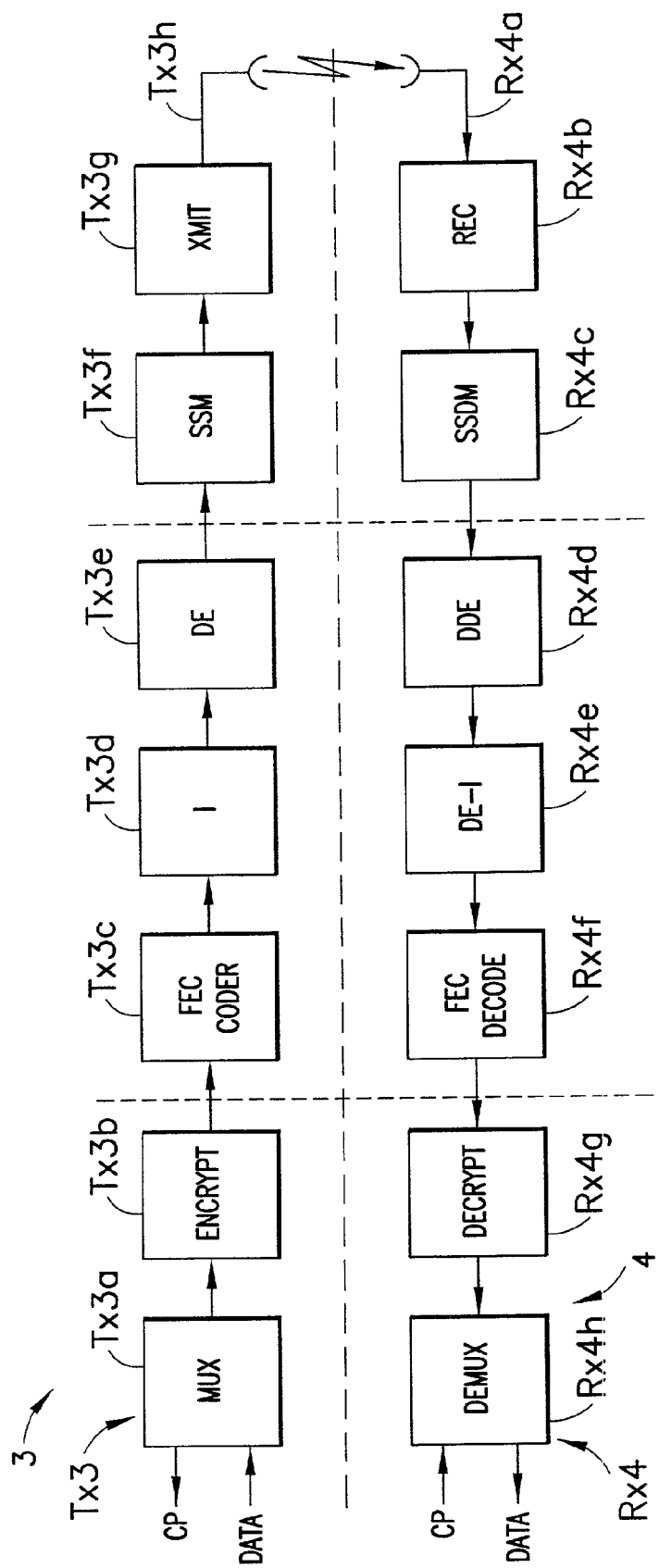
Figure 7:
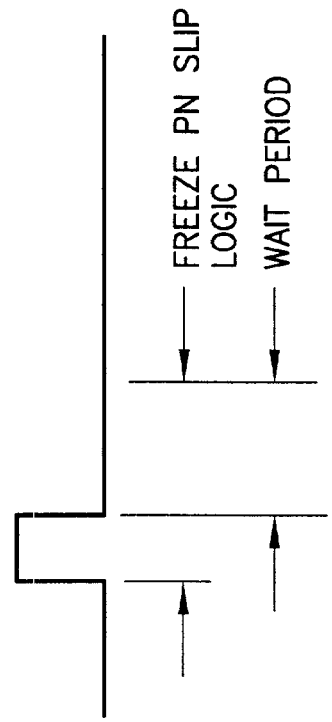
FIG. 7 is a copy of a photograph of a waveform captured on the display of an oscilloscope coupled to junction A that depicts the strike of a low power data stream of a transmitted message by a hostile high power, long duration J pulse including the saturation of the data signals.
Figure 8:
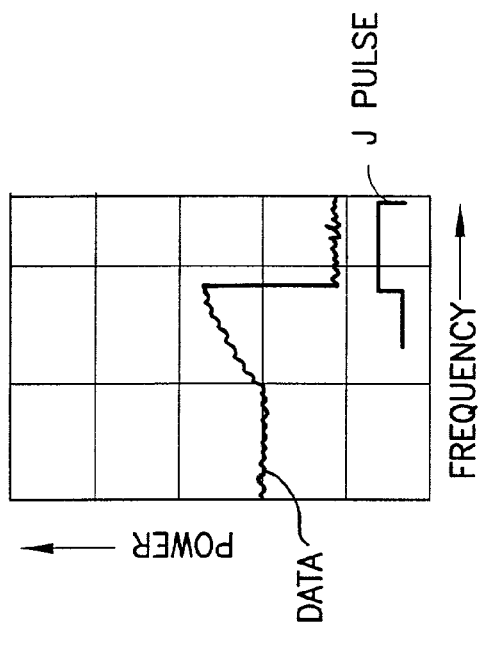
FIG. 8 is a representation of a single PN signal whose generation is delayed at SSDM Rx4c of transceiver 4 to delay processing of any incoming data to verify that a loss of carrier is not due to a cause other than a hit to a transmitted message by a hostile J pulse.
Figure 6:
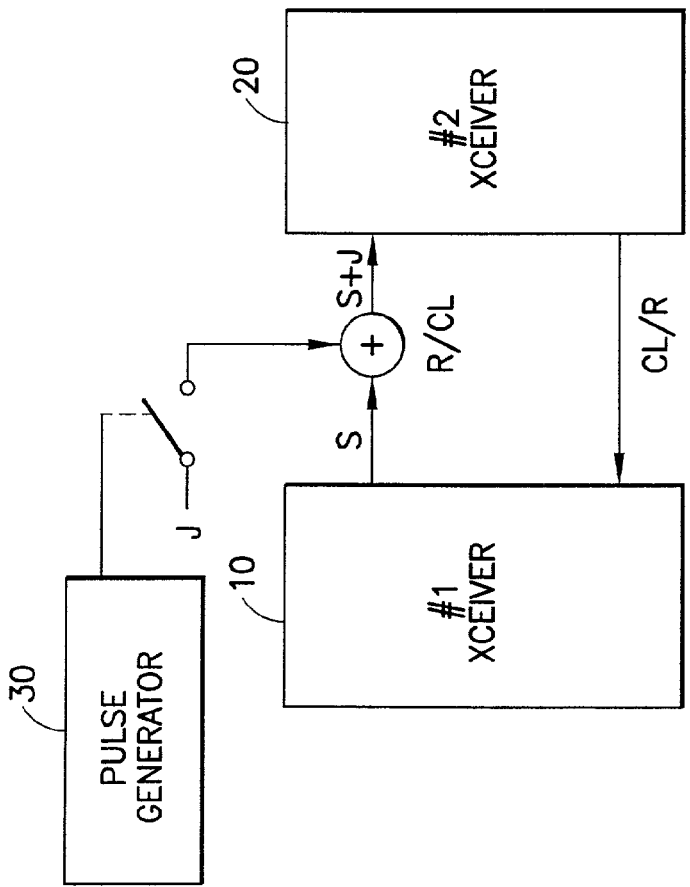
FIG. 6 is a schematic of laboratory test equipment for simulating a high power J pulse striking a segment of a low power digital data signal message at summing junction A.

The transceivers 3 and 4 of FIG. 2 demonstrate a dramatically superior ability to mitigate the loss of remnant data within a transmitted message struck by a J pulse compared to the prior art transceivers 1 and 2 of FIG. 1 and variations thereof.

Messages sent between the prior art transceivers 1 and 2 are not able to survive high power J pulses of even a very short duration because the gap in the data stream of a message causes the receiver to lose recovered carrier coherence with the data stream. The loss of the data stream requires the receiver Rx2b to re-synchronize with the remnant data that survived the J pulse. However, data continues to be lost during the time required for receiver Rx2b to detect the gap in data, the time to initiate a resynchronization routine and the time to sync with incoming data. Significant segments of a transmitted message are lost during the cumulative periods of time.

A high power, long duration J pulse saturates and completely suppresses an impacted segment of a transmitted message made up of low power digital data symbols. Both the prior art transceivers of FIG. 1 and the new transceivers of FIG. 2 lose data that is directly impacted by a J pulse. However, the prior art transceivers also lose undamaged, remnant data segments of a transmitted message that follow the trailing edge of an expired J pulse.

Remnant data created by an impact from a J pulse is frequently lost to a prior art receiver Rx2, for example, because the time period allocated to sync with incoming data is shorter than the gap in the data. Consequently, the arriving remnant information is permanently lost and the downstream elements including the de-interleaver Rx2d, the FEC decoder Rx2e, the differential data decoder Rx2f, the de-encrypter Rx2g and the de-multiplier Rx2h all fail to sequentially receive an incoming message and thereby do not attempt sync. The failure to sync causes the loss of the to balance of the message following the J pulse.

The loss of synchronization is frequently fatal for the prior art systems of FIG. 1 for the foregoing reasons. In contrast, the new and improved systems of FIG. 2 include features that permit the rapid re-synchronization with incoming signals and the full recovery of all the incoming remnant data received after a J pulse expires.

In addition, the prior art receiver Rx2b of transceiver 2 may initially sync with incoming remnants of a message hit by a short J pulse. However, the downstream elements of the receiver are soon likely to lose sync upon receipt of inverted data bit pairs that are by-products of a J pulse hitting a message within the transmission channel. The inverted bit pairs are forwarded to the de-interleaver Rx2b. The de-interleaver is not able to sync with inverted bit pairs. Therefore, the incoming data remnants no long flow to the downstream elements including the FEC decoder Rx2e, the DDE decoder Rx2f, the de-encrypter Rx2g and the DMUX Rx2h. The transceiver 2 loses synchronization with the message transmitted from transceiver 1 until a sufficient number of bits have been received to allow transceiver 2 to resynchronize. Independent resynchronization of the DI Rx2b, FEC Decode Rx2e, DDE Rx2f, De-crypt Rx2g and DMUX Rx2h elements is required.

A differential decoder Rx2f is able to sync both with non-inverted and inverted bit pairs but the bit pairs are not able to reach decoder Rx2f for failure to get past the upstream elements that are not able to sync or an inverted data bit pair. The calling transceiver Tx1 re-transmits the message when an expected response from the called transceiver is not received after an interval of time.

The systems were modified in one attempt to overcome their vulnerability to high power long duration J pulses. The modifications included eliminating the differential encoder Tx1c from transceiver 1 and the differential decoder Rx2f from transceiver 2. Receiver Rx2 still performed poorly at re-synchronizing with the incoming data following a gap in data because of a too short sync period. Of course, normal system performance was improved for this embodiment because there were no differential encoding errors to degrade performance having removed those elements.

A second experiment involved relocating the differential encoder ("DE") Tx1c of transceiver 1 between the FEC encoder Tx1d and the interleaver Tx1e. In addition, the differential decoder ("DDE") Rx2f of transceiver 2 was relocated between FEC decoder Rx2e and the de-interleaver interleaver ("DI") Rx2d. This embodiment performed poorly against long J pulses.

A third experiment led to the discovery of the new and improved transceivers 3 and 4 of FIG. 2. An important feature of the embodiment of FIG. 2 is the relocating of the differential encoder Tx3e close to the transmitter Tx3g of transceiver 3, downstream from the FEC encoder Tx3c and interleaver Tx3d. In addition, differential decoder ("DDE") Rx4d of transceiver 4 was relocated close to the receiver Rx4b of transceiver 4, upstream from the de-interleaver Rx4e and FEC decoder Rx4f. These locations of the encoder and decoder elements within transceivers 3 and 4, along with other modifications discussed below, enable transceivers 3 and 4 to salvage significantly greater amounts of the remnant data of messages struck by a J pulse than the prior art systems of FIG. 1 and the first and second modified versions of the systems of FIG. 1 identified immediately above.

The improvement to the ability of a transceiver to recover data from a transmitted message hit by J pulses is due in large part to locating the DE Tx3e near transmitter Tx3g of transceiver 3, downstream from the FEC encoder and interleaver, and locating the DDE Rx4d near the receiver Rx4b, upstream from the FEC decoder Rx4f and de-interleaver Rx4e within transceiver 4.

With reference to transceivers 3 and 4 of FIG. 2, DDE Rx4d is located close to the output of receiver Rx4b to synchronize immediately with the first data bit pair or inverted bit pair passed to the DDE from receiver Rx4b, whether the bit pair is inverted or not. The DDE forwards both natural bit pairs and righted bit pairs to the down stream elements including the ("DI") Rx4e and FEC decoder Rx4f. Therefore, once a J pulse expires, receiver Rx4 of transceiver 4 is able to receive, process and pass the balance of incoming remnant data segments of a damaged message to the downstream elements from DDE Rx4d to DMUX Rx4h. Each of downstream elements from DDE Rx4d to DMUX Rx4h synchronizes on received data bit pairs, or inverted bit pairs that are righted by DDE Rx5dh. Therefore, the new and improved systems of FIG. 2 are able to recover substantial remnant data produced by a J pulse hit on a transmitted message.

Another important feature of transceivers 3 and 4 is an improvement to the automatic gain control circuit ("AGC") 110 of receiver Rx4b. The improvement is the addition of a voltage burst clamp 111 (i.e., a surge protector) at the output 112 of AGC circuit. (See, FIG. 4.) The burst clamp protects a half-wave rectifying detector diode 113 located within the feedback loop 114 of the AGC 110 from high levels of RF energy associated with a system hit by a J pulse. A hit from a J pulse drives the detector diode 113 into saturation, absent the burst clamp, thereby dramatically slowing down the AGC recovery. The longer AGC recovery period allows significant loss of remnant data.

With a burst clamp in place, AGC 111 rapidly recovers from a RF energy hit and timely forwards arriving remnant data of a damaged message to the DDE Rx4d and, from there to the other downstream elements of receiver Rx4.

The recovery of receiver Rx4 from a hit by a J pulse is also enhanced by using direct digital synthesizers ("DDS") that restart instantly following a J pulse hit to permit rapid synchronizing with the incoming remnant data at each of the downstream elements extending from the receiver Rx4b to the DEMUX Rx4h.

A Doppler modulator and a Doppler demodulator are added to the transmitters and receivers, respectively, of transceivers 3 and 4 when they are mounted within different aircraft. A Doppler modulator (not shown) located within transceiver 3 in one of the aircraft is located near the transmitter Tx3g and a demodulator (not shown) within transceiver 4 in the other aircraft is located near the receiver Rx4b of transceiver 4.

The Doppler modulators and demodulators includes firmware designed to let the Doppler demodulator to "flywheel" through the downtime of a receiver hit by a J pulse without firmware intervention with the operation of the systems and methods associated with the discussions of transceivers 3 and 4.

Finally, alternate correlation peaks potential burst intervals are not recommended for providing rapid synchronization of a receiver following a gap in incoming data due to a hit from a J pulse because data bit pair inversions occur randomly.

Testing and comparing the performance with J pulses of coherent systems versus non-coherent systems indicated that coherent carrier recovery works well and is the preferred choice of the two options for transceivers operated within hostile jamming signal environments. The non-coherent version recovers from a J pulse faster but is not energy efficient requiring much higher effective isotropic radiated power ("EIRP").

What is claimed is:

1. A coherent radio frequency ("RF") digital data communication system for mitigating the loss of digital data among segments of a transmitted message following the trailing edge of a jamming ("J") pulse that strikes a transmitted message, the system comprising the following elements, in combination, a transmitter (Tx3) having multiple digital data processing elements including a forward error correcting ("FEC") encoder (Tx3c), an interleaver ("I") (Tx3d) and a differential decoder ("DE") (Tx3e), aligned with an outward path from one element to the next traveled by a message for preparing the message for processing by complementary processing elements at a receiver (Rx4) to which the transmitted message is addressed, wherein the receiver (Rx4) further comprising multiple, digital data processing elements that are complements to those of the transmitter (Tx3) including a FEC decoder (Rx4f), a de-interleaver ("DI") (Rx4e) and a differential data decoder ("DDE") (Rx4d) within a path for processing an incoming digital data message having lost a data segment to a J pulse during transmission, an AGC circuit having a burst clamp that operates to protect AGC components from saturating while the J pulse strikes the transmitted message to enable the receiver to recover coherence with an incoming message following the trailing edge of the J pulse, wherein, the DDE (Rx4d) synchronizes with either incoming data bit pairs, or inverted data bit pairs, among remnant segments of the message following the trailing edge of an expired J pulse that struck the transmitted message and incoming inverted data bit pairs, allowing the DDE (Rx4d) to sequentially process received remnant data segments of the message created by the J pulse thereby allowing the DI (Rx4e) and the FEC decoder (Rx4f) to sequentially process the received remnant data segments.

2. The coherent RF digital data communication system of claim 1 wherein the differential encoder ("DE") Tx3e of transmitter Tx3 is located near transmitter Tx3g and the differential decoder ("DDE") Rx4d of receiver Rx4 is located near receiver Rx4b.

3. The coherent RF digital data communication system of claim 1 wherein a spread spectrum modulator ("SSM") element Tx3f is positioned within transmitter Tx3 between the DE Tx3e and transmitter Tx3h for spreading the transmitted message and a spread spectrum demodulator ("SSDM Rx4c") is positioned within receiver Rx4 between the DDE Rx4d and receiver Rx4b for de-spreading a received message.

4. The coherent RF digital data communication system of claim 1 wherein transceiver Tx3 further includes a multiplexer ("MUX")Tx3a and an encrypter ("ENCRYPT") Tx3b coupled to the FEC coder Tx3c and other elements of transmitter Tx3 in alignment with an outgoing message and wherein receiver Rx4 further includes a de-multiplexer ("DMUX")Rx4h and de-encrypter ("DE-CRYPT") Rx4g coupled to the FEC decoder Rx4e and other elements of receiver Rx4 in alignment with an incoming message.

5. The coherent RF digital data communication system of claim 1 wherein the burst clamp is located within the automatic gain controller ("AGC") to protect a signal detection diode within a feedback loop of the AGC for rapid coherence recovery with remnant data of the message struck by the J pulse.

6. The coherent RF digital data communication system of claim 3 wherein the SSDM Rx4c includes a pseudorandom number ("PN") slip circuit to inhibit temporarily despreading of received data to verify the loss of coherence recovery due to a strike of an incoming message by the J pulse.

7. A coherent radio frequency ("RF") digital data communication method for mitigating the loss of digital data among segments of a transmitted message following the trailing edge of a jamming ("J") pulse that strikes a transmitted message, the method comprising the following combination of steps, at a transmitter (Tx3), forward error correcting ("FEC") encoding (Tx3c), interleaving ("I") (Tx3d) and differential encoding ("DE") (Tx3e) a message for preparing the message for processing, at a receiver Rx4, receiving the transmitted message for correcting data errors within a received message by performing complementary steps to those performed on the message at the transmitter (Tx3) including differential data decoding ("DDE") (Rx4d), de-interleaving ("DI") (Rx4e) and forward error correcting ("FEC") decoding (Rx4f) the received message, and recovering incoming message data including remnant message data of the message hit by the J pulse by performing the DDE step near the output of receiver Rx4b by synchronizing with incoming data bit pairs and inverted data bit pairs thereby synchronizing rapidly to the incoming message at each down stream element, and by burst clamping an AGC circuit in the receiver to protect AGC components from saturating while the J pulse strikes the transmitted message for enabling recovery coherence with the incoming message following the trailing edge of the J pulse.

8. The coherent RF digital data communication method of claim 7 wherein the differential encoding step("DE") tx3e at the transmitter Tx3 occurs just prior to transmitting the message and the differential decoding ("DDE") Rx4d step occurs just after receiving the transmitted message by receiver Rx4.

9. The coherent RF digital data communication method of system of claim 7 including the steps of spreading the transmitted message at spread spectrum modulator ("SSM") element Tx3f prior to transmitting Tx3g the message and de-spreading the message after receiving the message at receiver Rx4b.

10. The coherent RF digital data communication method of claim 7 including the steps at the transmitter (Tx3) of multiplexing the message at multiplexer ("MUX") Tx3a and encrypting ("ENCYPT") (Tx3b) the message prior to transmitting the message to the receiver (RX4) and at the receiver (Rx4) de-encrypting the received message and de-multiplexing the message.

11. The coherent RF digital data communication method of claim 7 wherein burst clamping is performed within the automatic gain controller ("AGC") for protecting a signal detection diode within a feedback loop of the AGC for rapidly obtaining coherence recovery with remnant data of the message struck by the J pulse.

12. The coherent RF digital data communication system of claim 11 wherein the step of SSDM Rx4*c* demodulating includes inhibiting a pseudorandom number ("PN") slip circuit for temporarily delaying the de-spreading of received data to verify the loss of coherence recovery due to a strike of an incoming message by a J pulse.

* * * * *

UNITED STATES PATENT AND TRADEMARK OFFICE
CERTIFICATE OF CORRECTION

PATENT NO. : 6,975,683 B2
APPLICATION NO. : 09/826329
DATED : December 13, 2005
INVENTOR(S) : Mower et al.

It is certified that error appears in the above-identified patent and that said Letters Patent is hereby corrected as shown below:

In Column 1, line 2, Item 73, after "NY" insert -- 10016 --.

In Column 8, line 1, claim 4, delete "Rx4e" and insert -- Rx4f--.

Signed and Sealed this

Twenty-first Day of November, 2006

JON W. DUDAS
*Director of the United States Patent and Trademark Office*